United States Patent [19]

Hayama et al.

[11] Patent Number: 5,543,440

[45] Date of Patent: Aug. 6, 1996

[54] PROCESS FOR PRODUCING POWDERED CARBOXYL-CONTAINING POLYMER

[75] Inventors: Kazuhide Hayama; Yukio Saitoh; Yasuo Kitani; Katsuhiko Yamada, all of Mie, Japan

[73] Assignee: Mitsubishi Chemical Corporation, Tokyo, Japan

[21] Appl. No.: 378,715

[22] Filed: Jan. 26, 1995

[51] Int. Cl.$^6$ ...................................... C08F 20/06
[52] U.S. Cl. .................. 523/103; 523/332; 523/523; 523/526; 525/329.7; 525/329.9; 525/330.2
[58] Field of Search .................. 523/103, 332, 523/526, 523; 525/329.7, 329.9, 330.2; 528/498, 499

[56] References Cited

U.S. PATENT DOCUMENTS

| | | | |
|---|---|---|---|
| 3,296,172 | 1/1967 | Funck et al. | 523/332 |
| 3,389,109 | 6/1968 | Harmon et al. | 523/332 |
| 4,049,744 | 9/1977 | Masters | 525/119 |

*Primary Examiner*—Thomas R. Weber
*Attorney, Agent, or Firm*—Oblon, Spivak, McClelland, Maier & Neustadt, P.C.

[57] ABSTRACT

A process for producing a powdered carboxyl-containing polymer comprising mixing a solution of a water-insoluble polymer containing a carboxyl group per molecule in a hydrophilic organic solvent (e.g., ethanol) and an aqueous solution of a dispersant comprising a neutralized copolymer of a carboxyl-containing unsaturated monomer and a (meth-)acrylic ester to precipitate the water-insoluble polymer. Fine polymer particles free from adhesion or agglomeration are obtained efficiently. Since any residual unreacted carboxyl-containing monomers are dissolved out in water as a precipitating solvent, the resulting powdered polymer has a reduced residual content of the unreacted monomers which may be poisonous and is therefore useful as a base resin of cosmetics or a coating resin for applications involving contact with the skin.

7 Claims, No Drawings

PROCESS FOR PRODUCING POWDERED CARBOXYL-CONTAINING POLYMER

FIELD OF THE INVENTION

This invention relates to a process for producing a powdered carboxyl-containing polymer. More particularly, it relates to a process for efficiently obtaining a water-insoluble carboxyl-containing polymer in a finely powdered form by precipitation using water as a poor solvent. Because the powdered polymer obtained has a reduced residual content of unreacted monomers, the process is suitable for the production of base resins of cosmetics or coating resins for applications involving contact with the skin.

BACKGROUND OF THE INVENTION

Water-insoluble carboxyl-containing polymers are generally obtained by copolymerizing a carboxyl-containing unsaturated monomer and other unsaturated monomer(s) by emulsion polymerization, suspension polymerization or solution polymerization using an organic solvent. In the case of emulsion polymerization or suspension polymerization, it is difficult to obtain a copolymer having a uniform composition because the carboxyl-containing unsaturated monomer dissolves in water. It is therefore effective for obtaining a copolymer having a uniform composition to conduct solution polymerization using an organic solvent in which both an unsaturated monomer and the polymer produced dissolve uniformly.

Processes for recovering the water-insoluble polymer as produced by solution polymerization in a powdered form include a process comprising removing the organic solvent by evaporation to dryness and grinding the residual solid polymer and a process comprising adding a poor solvent for the polymer, such as water, to the organic solvent solution of the polymer to precipitate the polymer.

The former process is inefficient because great energy is required for removal of the solvent and unreacted monomers. On the other hand, the latter precipitation process has a disadvantage that the precipitated copolymer particles are ready to adhere to each other and agglomerate unless the polymer solution should be adjusted to a considerably low concentration and the poor solvent, such as water, should be used in large quantity.

SUMMARY OF THE INVENTION

An object of the present invention is to provide a process for efficiently recovering a water-insoluble carboxyl-containing polymer in a finely powdered form by a precipitation process, in which the water-insoluble polymer is precipitated from a solution in a hydrophilic organic solvent in the presence of water as a poor solvent, without causing adhesion and agglomeration of precipitated polymer particles.

The present invention provides a process for producing a powdered carboxyl-containing polymer, which is suitable as a base resin of cosmetics or a coating resin which may come into contact with the skin, comprising mixing a solution of a water-insoluble polymer containing a carboxyl group per molecule in a hydrophilic organic solvent and an aqueous solution of a dispersant comprising a neutralized copolymer of a carboxyl-containing unsaturated monomer represented by formula (I):

$$\overset{R^1}{\underset{CH}{|}}=\overset{R^2}{\underset{C}{|}}-COOH \qquad (I)$$

wherein $R^1$ represents a hydrogen atom or a methyl group; and $R^2$ represents a hydrogen atom, a methyl group or —$CH_2COOH$, and a (meth)acrylic ester to precipitate the water-insoluble polymer.

DETAILED DESCRIPTION OF THE INVENTION

The term "(meth)acrylic ester" as used herein means both "an acrylic ester" and "a methacrylic ester"; the term "(meth)acrylic acid" as used herein means both "acrylic acid" and "methacrylic acid"; and the term "(meth)acrylate" as used herein means both "an acrylate" and "a methacrylate".

The water-insoluble carboxyl-containing polymer which can be applied to the process of the present invention can be obtained by, for example, copolymerization of a carboxyl-containing unsaturated monomer and other unsaturated monomers.

Examples of the carboxyl-containing unsaturated monomers are (meth)acrylic acid, itaconic acid, crotonic acid, maleic acid, and a monoalkyl ether of maleic acid.

Examples of the other unsaturated monomers include alkyl (meth)acrylates, such as methyl (meth)acrylate, ethyl (meth)acrylate, propyl (meth)acrylate, butyl (meth)acrylate, t-butyl (meth)acrylate, octyl (meth)acrylate, lauryl (meth)acrylate, and stearyl (meth)acrylate; cycloalkyl (meth)acrylates, such as cyclohexyl (meth)acrylate; aromatic hydrocarbon-containing alkyl (meth)acrylates, such as benzyl (meth)acrylate; hydrophilic monomers, such as 2-hydroxyethyl (meth)acrylate, N-vinylpyrrolidone, and acrylamide; lipophilic monomers, such as styrene, α-methylstyrene, and vinyl acetate; and macromers containing a polysiloxane group, such as polysiloxane macromers having one ethylenically unsaturated group (e.g., FM 0711, FM 0721 and FM 0725, all produced by Chisso Corporation) and polysiloxane macromers having an ethylenically unsaturated group at each terminal thereof (e.g., FM 7711, FM 7721, and FM 7725, all produced by Chisso Corporation).

The polymerization reaction is carried out in a conventional manner. For example, a carboxyl-containing unsaturated monomer and other unsaturated monomers are dissolved in a hydrophilic organic solvent hereinafter described or other appropriate solvent in a concentration of 20 to 50% by weight and allowed to react in the presence of 0.1 to 2% by weights based on the total monomers, of a radical polymerization initiator, such as benzoyl peroxide, lauroyl peroxide or azobisisobutyronitrile, in an inert gas atmosphere, such as nitrogen, at 60° to 90° C. for 3 to 10 hours.

The ratio of the carboxyl-containing unsaturated monomer in the total monomer mixture is decided appropriately so as to provide a copolymer which is soluble in a hydrophilic organic solvent and insoluble in water, i.e., having a water solubility of not higher than 3% by weight at 25° C. Such a ratio of the carboxyl-containing unsaturated monomer varies depending on the kind of the other unsaturated monomers (whether hydrophilic or hydrophobic) and the molecular weight of the resulting polymer. In general, in using acrylic acid or methacrylic acid as a carboxyl-containing unsaturated monomer and using a hydrophobic unsaturated monomer, such as an alkyl (meth)acrylate, as other unsaturated monomer, the former monomer is used in a proportion of from 5 to 70% by weight, preferably from 10 to 50% by weight; and the latter monomer is used in a proportion of from 30 to 95% by weight, preferably from 50 to 90% by weight. If the proposition of the carboxyl-containing monomer component in the polymer is too low, the polymer is hard to dissolve in a hydrophilic organic solvent. If it is too high, the polymer has unfavorably increased water solubility.

Of various carboxyl-containing polymers, those having a polysiloxane group in the molecule in an amount of from 5 to 50% by weight are particularly advantageous; for they are obtained in a more finely divided powder form than other polymers for some unknown reasons. Polymers having a polysiloxane group can be obtained by copolymerizing the above-mentioned polysiloxane macromer and a carboxyl-containing unsaturated monomer and, if desired, other unsaturated monomers as disclosed in JP-A-3-128909 (the term "JP-A" as used herein means an "unexamined published Japanese patent application"). They may also be obtained by reacting an epoxy-terminated polysiloxane, such as FM 0521 (a trade name, produced by Chisso Corporation), to the carboxyl group of a carboxyl-containing polymer. Further, a carboxyl-containing unsaturated monomer and other unsaturated monomer(s) may be copolymerized using a radical initiator, such as a peroxide, in the presence of a mercapto-containing polysiloxane compound for example, BX16-838A (a trade name, produced by Toray Dow Corning Co., Ltd.) or X-22-980 or X-22-167B (a trade name, produced by Shin-Etsu Chemical Co., Ltd.) to obtain a polymer having a polysiloxane group bonded via a sulfide bond. In this case, a proportion of a carboxyl-containing unsaturated monomer and a proportion of the other unsaturated monomers in the polymer of this type are defined as a proportion of a carboxyl-containing unsaturated monomer and a proportion of the sum of the other unsaturated monomers and the polysiloxane compound, respectively.

The water-insoluble polymer which can suitably be applied to the present invention usually has a molecular weight of 5,000 to 2,000,000, preferably 10,000 to 500,000. the present invention should have a water-solubility of at least 5% by weight at 25° C. If the water-solubility is less than 5% by weight, the solvent remains in the polymer particles and hardly dissolves in water so that the polymer particles precipitated tend to adhere to each other and to agglomerate.

Suitable hydrophilic organic solvents include aliphatic alcohols, such as methyl alcohol, ethyl alcohol, propyl alcohol, isopropyl alcohol, butyl alcohol, and isobutyl alcohol; cyclic ethers, such as 1,4-dioxane and tetrahydrofuran; ketones, such as acetone and methyl ethyl ketone; and esters, such as methyl acetate, ethyl acetate, and methyl formate. The most suitable of these solvents are acetone, methyl alcohol, ethyl alcohol, isopropyl alcohol, etc.; for they are freely miscible with water and available on an industrial scale at a low price, and have a boiling point lower than 100° C. (preferably 50° to 90° C.) so as to be easily removed by distillation from the dispersed system after the precipitation.

The concentration of the water-insoluble polymer in the hydrophilic organic solvent usually ranges from 10 to 60% by weight. Taking the viscosity of the solution and efficiency of precipitation into consideration, a preferred concentration is from 30 to 50% by weight. Too low a polymer concentration leads to use of a large quantity of water for precipitation, and too high a polymer concentration increases the viscosity, making the solution difficult to handle. Since a reaction mixture resulting from the aforesaid polymerization reaction in a hydrophilic organic solvent usually has a polymer concentration of 20 to 50% by weight, the reaction mixture may be used as such as a polymer solution to be mixed with a dispersant solution hereinafter described. If desired, the hydrophilic organic solvent of the reaction mixture may be substituted for a different hydrophilic organic solvent or re-dissolved.

The dispersant which can be used in the present invention is a neutralized copolymer comprising a carboxyl-containing unsaturated monomer represented by formula (I) and a (meth)acrylic ester.

Examples of the unsaturated monomer of formula (I) are acrylic acid, methacrylic acid, itaconic acid, and crotonic acid. The proportion of the carboxyl-containing unsaturated monomer of formula (I) in the total unsaturated monomer mixture is preferably from 10 to 70% by weight. If the proportion is less than 10% by weight, the water-solubility of the dispersant is reduced to lessen the effect as a dispersant. If it exceeds 70% by weight, the effect of the dispersant is reduced due to its too hydrophilic properties.

The (meth)acrylic ester which can be copolymerized with the carboxyl-containing unsaturated monomer of formula (I) preferably includes those represented by formula (II):

wherein $R^3$ represents a hydrogen atom or a methyl group; $R^4$ represents an alkyl group having 1 to 22 carbon atoms, a cycloalkyl group having 6 to 22 carbon atoms, or an aromatic group-containing alkyl group having 7 to 22 carbon atoms.

Examples of the (meth)acrylic ester include the alkyl (meth)acrylates, cycloalkyl (meth)acrylates, and aromatic hydrocarbon-containing alkyl (meth)acrylates which have been enumerated above as examples of unsaturated monomers constituting the water-insoluble polymer. The (meth)acrylic ester is preferably used in a proportion of from 30 to 90% by weight based on the total unsaturated monomers.

The above-described monomers may be used in combination with not more than 50% by weight, based on the total unsaturated monomers, of other copolymerizable unsaturated monomers, such as hydrophilic monomers, e.g., 2-hydroxyethyl (meth)acrylate, N-vinylpyrrolidone, and acrylamide; and lipophilic monomers, e.g., styrene, α-methylstyrene, and vinyl acetate, so long as the effect of the resulting dispersant is not reduced.

The dispersant according to the present invention can be obtained by neutralizing the carboxyl groups in the copolymer of the above-mentioned unsaturated monomers. The composition of the copolymer before being neutralized (hereinafter referred to as a dispersant precursor polymer) may be quite the same as that of the aforesaid water-insoluble carboxyl-containing polymer to be powdered. The dispersant precursor polymer has a molecular weight usually of from 2,000 to 500,000, and preferably from 5,000 to 100,000.

The dispersant can be prepared by a general polymerization reaction followed by a general neutralization reaction. For example, the unsaturated monomer of formula (I), the unsaturated monomer of formula (II) and, if desired, other copolymerizable unsaturated monomers are copolymerized in the same manner as described for the water-insoluble carboxyl-containing polymer to obtain a precursor polymer, which is then neutralized with an alkali. It is also possible that the carboxyl-containing unsaturated monomer of formula (I) is first neutralized with an alkali and then copolymerized with other unsaturated monomers to obtain the dispersant copolymer.

The alkali which can be used for neutralization includes inorganic alkalis, such as sodium hydroxide, lithium hydroxide, and potassium hydroxide; amines, such as trimethylamine, dimethylethanolamine, and 2-amino-2-methyl-propanol; and ammonia. The alkali neutralization is suitably effected to such a degree that 50 to 100 mol % of the carboxyl-containing unsaturated monomer of formula (I) is neutralized. The degree of neutralization is decided appropriately depending on the dispersing ability and water-solubility of the dispersant. The alkali for neutralization is usually used as a 1 to 20% by weight aqueous solution. Note that addition of an alkali in excess over 100 mol % should be avoided because the excess would act to neutralize part of the carboxyl groups of the water-insoluble carboxyl-containing copolymer to be powdered.

The thus prepared dispersant solution usually has a solid content of 10 to 50% by weight so that it may be formulated into an aqueous dispersant solution by simply adding water thereto or, if desired, substituting with water. The aqueous dispersant solution preferably has a dispersant concentration of from 0.01 to 1% by weight on a solid basis. Where a dispersant solution as obtained by polymerization is used as such, the concentration of the hydrophilic solvent in the aqueous solution is preferably not more than 5% by weight.

The dispersant is used in an amount of from 0.1 to 20 parts by weight, preferably from 0.5 to 5 parts by weight, per part by weight of the water-insoluble polymer to be precipitated. If the amount of the dispersant is less than 0.1 part by weight, no substantial dispersing effect can be produced. If it exceeds 20 parts by weight, no further improvement in dispersing effect is observed, only leading to bad economy.

According to the present invention, a hydrophilic organic solvent solution of a water-insoluble carboxyl-containing polymer and an aqueous dispersant solution are mixed together to precipitate the polymer in a powdered form. The mixing of the two solutions may be performed according to mode (1) in which an aqueous dispersant solution is slowly added to a hydrophillic organic solvent solution while stirring or mode (2) in which a hydrophilic organic solvent solution is slowly added to an aqueous dispersant solution while stirring. Whichever mode is followed, the finally obtained slurry comprises a satisfactorily powdered polymer. Mode (2) is more economical than mode (1) because the latter is attended by an increase in viscosity of the system in the course of addition and therefore needs greater stirring power. A mode in the middle between mode (1) and mode (2) may also be taken. For example, an aqueous dispersant solution and the polymer solution are simultaneously added to a system and stirred as in line mixing.

Water is used in an amount sufficient to be uniformly mixed with the hydrophilic organic solvent, usually 3 to 20 times the weight of the water-insoluble polymer. If the amount of water is less than 3 times the weight of the polymer, the resulting slurry is highly viscous and is not easy to handle. More water than 20 times is uneconomical.

The temperature for precipitation is not higher than 100° C. and ranges from room temperature up to the boiling point of the hydrophilic organic solvent. Where the above-mentioned mode (2) is taken, distillation of the organic solvent added may be conducted simultaneously with the mixing by elevating the temperature of the mixing system above the boiling point of the solvent or by reducing the pressure.

The resulting powder slurry is then subjected to filtration and drying to recover the powder as a dry powder. In order to prevent particles from adhesion during filtration, it is effective to remove the hydrophilic organic solvent from the slurry by distillation prior to filtration. Removal of the solvent by distillation can be conducted by heating the slurry under normal pressure or reduced pressure.

The powdered polymer obtained by the process of the present invention comprises microfine particles usually having a particle size of not greater than 1000 μm.

According to the present invention, since water is used as a precipitating solvent, the unreacted carboxyl-containing monomer remaining in the water-insoluble polymer is dissolved in water. Further, of water-insoluble unreacted monomers, if any, the one having a low boiling point is distilled off simultaneously with the distillation of the hydrophilic organic solvent. Therefore, the resulting powdered polymer has a reduced unreacted content. Thus, the process of the present invention is not only efficient for obtaining a finely powdered polymer but is advantageous for preparing a powdered polymer which is free from a fear of toxicity due to unreacted monomers and is therefore useful as a base resin of cosmetics or a coating resin for applications involving contact with the skin.

The present invention will now be illustrated in greater detail with reference to Examples and Comparative Examples, but it should be understood that the present invention is not construed as being limited thereto. Unless otherwise indicated, all the parts and percents are given by weight.

PREPARATION EXAMPLE 1

Preparation of Water-Insoluble Carboxyl-Containing Polymer

In a four-necked flask equipped with a reflux condenser, a thermometer, a glass tube for introducing nitrogen, and a stirrer were charged 10 parts of acrylic acid, 15 parts of methacrylic acid, 10 parts of methyl methacrylate, 40 parts of n-butyl methacrylate, 20 parts of lauryl methacrylate, 10 parts of polysiloxane macromer FM 0721 (produced by Chisso Corp.) having a molecular weight of 5,000, 150 parts of ethanol., and 0.6 part of azobisisobutyronitrile. The mixture was allowed to react at 80° C. for 6 hours in a nitrogen stream to obtain a 40% ethanol solution of a water-insoluble carboxyl-containing polymer having a molecular weight of 150,000 (hereinafter designated solution A-1). Gas chromatography of solution A-1 revealed existence of 1,400 ppm of acrylic acid and 3,500 ppm of methacrylic acid on a solid basis.

In the same flask as used above were charged 10 parts of acrylic acid, 15 parts of methacrylic acid, 20 parts of methyl methacrylate, 10 Darts of t-butyl acrylate, 25 parts of a both end mercapto-modified polysiloxane X-22-167B (produced by Shin-Etsu Chemical Co., Ltd.) having a molecular weight of 3,000, 150 parts of acetone, and 1.2 parts of azobisisobutyronitrile. The mixture was allowed to react at 60° C. for 10 hours in a nitrogen stream to obtain a 40% acetone solution of a carboxyl-containing polymer having a molecular weight of 300,000 (designated solution A-2).

In the same flask as used above were charged 25 parts of acrylic acid, 25 parts of ethyl acrylate, 50 parts of n-butyl methacrylate, 200 parts of acetone, and 1.2 parts of azobisvaleronitrile. After the mixture was allowed to react at 60° C. for 6 hours in a nitrogen stream, 100 parts of acetone was removed from the reaction mixture by distillation for 4 hours to obtain a 50% acetone solution of a carboxyl-containing polymer having a molecular weight of 210,000 (designated solution A-3).

In the same flask as used above were charged 25 parts of acrylic acid, 25 pasts of t-butyl acrylate, 25 parts of t-butyl methacrylate, 10 parts of a polysiloxane macromet FM 0721 (produced by Chisso Corp.), 400 parts of acetone, and 1.2 parts of azobisisobutyronitrile. The mixture was allowed to react at 60° C. for 10 hours in a nitrogen stream to obtain a 20% acetone solution of a carboxyl-containing polymer having a molecular weight of 250,000 (designated solution A-4).

PREPARATION EXAMPLE 2

Preparation of Dispersant

In a four-necked flask equipped with a reflux condenser, a thermometer, a glass tube for introducing nitrogen, and a stirrer were charged 20 parts of methacrylic acid, 40 parts of methyl methacrylate, 40 parts of ethyl acrylate, 300 parts of isopropyl alcohol, and 1 part of azobisisobutyronitrile. The mixture was allowed to react at 80° C. for 6 hours in a nitrogen stream to obtain a dispersant precursor polymer having a molecular weight of 80,000. A 8.4% aqueous solution containing sodium hydroxide of an amount required for neutralizing 90 mol% of the methacrylic acid of the polymer was slowly added to the polymer solution to obtain a dispersant solution having a solid content of 20% (designated solution B-1).

In the same flask as used above were charged 20 parts of acrylic acid, 25 parts of methacrylic acid, 20 parts of methyl methacrylate, 25 parts of butyl acrylate, 10 parts of stearyl methacrylate, 200 parts of ethanol, and 1.5 parts of azobisisobutyronitrile. The mixture was allowed to react at 80° C. for 6 hours in a nitrogen stream to obtain a dispersant precursor polymer having a molecular weight of 70,000. An aqueous solution containing 2-amino-2-methylpropanol of an amount necessary for neutralizing 80 mol% of the carboxyl groups of the polymer was slowly added to the polymer solution to conduct 7neutralization. The ethanol used as a polymerization solvent was removed by distillation to obtain an aqueous dispersant solution having a solid content of 30% (designated solution B-2).

In the same flask as used above was charged 300 parts of ethanol, followed by heating to 80° C. in a nitrogen stream. To the flask were added dropwise 60 parts of acrylic acid, 140 parts of t-butyl acrylate, and 1.8 parts of benzoyl peroxide over a period of 1 hour, and the reaction was continued for 5 hours. The resulting polymer had a molecular weight of 36,000. An aqueous solution containing potassium hydroxide of an amount necessary for neutralizing 90 mol% of the acrylic acid of the polymer was added to the polymer solution, and ethanol used for the polymerization reaction was removed by distillation to obtain an aqueous dispersant solution having a solid content of 40% (designated solution B-3).

EXAMPLE 1

In a four-necked flask equipped with a reflux condenser, a thermometer, a glass tube for introducing nitrogen, and a stirrer were charged 20 parts of dispersant solution B-1 and 280 parts of water, followed by heating to 50° C. To the aqueous dispersant solution was added 50 parts of 40% ethanol solution A-1 of a carboxyl-containing polymer over a period of 1 hour while stirring to obtain a satisfactory slurry in which particles were not agglomerated. The slurry was heated up to 90° C. to remove the alcohol by distillation, cooled, filtered, and dried to recover 19.5 parts of a powdered water-insoluble polymer having an average particle size of 500 μm. The acrylic acid content and methacrylic acid content of the polymer were found to be reduced to 30 ppm and 70 ppm, respectively.

COMPARATIVE EXAMPLE 1

Precipitation was carried out in the same manner as in Example 1, except for using no dispersant and charging only 300 parts of water to the flask. As a result, the polymer particles precipitated underwent agglomeration, failing to provide satisfactory powder.

COMPARATIVE EXAMPLE 2

Precipitation was carried out in the same manner as in Example 1, except for charging 4 parts of sodium polyacrylate having a molecular weight of 20,000 in place of dispersant solution B-1 and charging 296 parts of water. The resulting polymer particles were very coarse particles having a particle size of 2 mm or greater.

EXAMPLE 2

In the same four-necked flask as used in Example 1 were charged 10 parts of dispersant solution B-2 and 290 parts of water, followed by heating to 70° C. To the aqueous dispersant solution was added 50 parts of 40% acetone solution A-2 containing a carboxyl-containing polymer over a period of 1 hour while stirring to obtain a slurry comprising microfine particles. The slurry was slowly heated up to 95° C. to remove the acetone by distillation, then cooled, filtered, and dried to obtain 19.7 parts of a satisfactorily powdered polymer having an average particle size of 450 μm.

EXAMPLE 3

Precipitation was carried out in the same manner as in Example 2, except for using 50% acetone solution A-3 containing a carboxyl-containing polymer, to obtain a satisfactory slurry. The slurry was worked up in the same manner as in Example 2 to obtain 19.5 parts of a satisfactory powder having an average particle size of 800 μm.

EXAMPLE 4

In a four-necked flask equipped with a reflux condenser, a thermometer, a glass tube for introducing nitrogen, and a stirrer were charged 100 parts of 20% acetone solution A-4 containing a water-insoluble carboxyl-containing polymer, followed by heating to 60° C. To the solution A-4 was added 200 parts of an aqueous dispersant solution prepared by mixing 2.5 parts of dispersant solution B-3 with water over a period of 30 minutes while stirring. While the system showed a slight increase in viscosity during the addition, there was finally obtained a slurry of microfine particles. The slurry was slowly heated up to 95° C. to remove the acetone by distillation, then cooled, filtered, and dried to recover 19.7 parts of a powdered water-insoluble polymer having an average particle size of 250 μm.

While the invention has been described in detail and with reference to specific examples thereof, it will be apparent to one skilled in the art that various changes and modifications can be made therein without departing from the spirit and scope thereof.

What is claimed is:

1. A process for producing carboxyl-containing polymer particles having a molecular weight of 5,000 to 2,000,000 comprising mixing a solution of a water-insoluble carboxyl-containing polymer derived from one or more carboxyl-containing unsaturated monomers and other unsaturated monomers in a hydrophilic organic solvent and an aqueous solution of a dispersant comprising a neutralized copolymer of the following monomers (1) and (2): (1) a carboxyl-containing unsaturated monomer represented by formula (I):

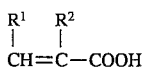
(I)

wherein $R^1$ represents a hydrogen atom or a methyl group; and $R^2$ represents a hydrogen atom, a methyl group or —$CH_2COOH$, and (2) a (meth)acrylic ester, to precipitate said water-insoluble polymer.

2. A process as claimed in claim 1, wherein the precipitating system contains water in an amount 3 to 20 times the weight of said water-insoluble polymer.

3. A process as claimed in claim 1, wherein said mixing is carried out by adding said aqueous dispersant solution to said water-insoluble polymer hydrophilic organic solvent solution.

4. A process as claimed in claim 1, wherein said mixing is carried out by adding said water-insoluble polymer hydrophilic organic solvent solution to said aqueous dispersant solution.

5. A process as claimed in claim 1, wherein said mixing is carried out by simultaneous addition of said aqueous dispersant solution and said water-insoluble polymer hydrophilic organic solvent solution while stirring.

6. A process as claimed in claim 1, wherein a slurry obtained by said mixing of said aqueous dispersant solution and said water-insoluble polymer hydrophilic organic solvent solution is distilled to remove said hydrophilic organic solvent and then the precipitated water-insoluble polymer is collected by filtrations.

7. A process as claimed in claim 1, wherein said hydrophilic organic solvent has a boiling point of not higher than 100° C.

* * * * *